United States Patent
Nagao et al.

(10) Patent No.: US 12,049,726 B2
(45) Date of Patent: Jul. 30, 2024

(54) FIBER SIZING AGENT, FIBER MATERIAL, MOLDING MATERIAL, AND MOLDED ARTICLE

(71) Applicant: DIC Corporation, Tokyo (JP)

(72) Inventors: Kenji Nagao, Takaishi (JP); Fuchih Li, Takaishi (JP); Sadamu Nagahama, Takaishi (JP)

(73) Assignee: DIC Corporation, Tokyo (JP)

( * ) Notice: Subject to any disclaimer, the term of this patent is extended or adjusted under 35 U.S.C. 154(b) by 607 days.

(21) Appl. No.: 17/291,418

(22) PCT Filed: Nov. 7, 2019

(86) PCT No.: PCT/JP2019/043610
§ 371 (c)(1),
(2) Date: May 5, 2021

(87) PCT Pub. No.: WO2020/105442
PCT Pub. Date: May 28, 2020

(65) Prior Publication Data
US 2021/0372040 A1 Dec. 2, 2021

(30) Foreign Application Priority Data
Nov. 20, 2018 (JP) .................. 2018-217314

(51) Int. Cl.
| | |
|---|---|
| *D06M 15/564* | (2006.01) |
| *B29B 15/08* | (2006.01) |
| *C08J 5/04* | (2006.01) |
| *C08J 5/06* | (2006.01) |
| *D06M 15/55* | (2006.01) |

(52) U.S. Cl.
CPC .......... *D06M 15/564* (2013.01); *B29B 15/08* (2013.01); *C08J 5/042* (2013.01); *C08J 5/06* (2013.01); *D06M 15/55* (2013.01); *D06M 2200/40* (2013.01)

(58) Field of Classification Search
CPC ............ B29B 15/08; C08J 5/042; C08J 5/06; D06M 15/564; D06M 15/55; D06M 2200/40; D06M 15/327; D06M 15/53; D06M 2101/40; D06M 13/11
See application file for complete search history.

(56) References Cited

U.S. PATENT DOCUMENTS

2020/0115514 A1* 4/2020 Nagao .................... C08L 63/00

FOREIGN PATENT DOCUMENTS

| | | |
|---|---|---|
| EP | 3 633 099 A1 | 4/2020 |
| JP | 2013-249562 A | 12/2013 |
| JP | 2015-007300 A | 1/2015 |
| JP | 2016-160567 A | 9/2016 |

OTHER PUBLICATIONS

Office Action dated Oct. 10, 2022, issued for Chinese Patent Application No. 201980076183.6 and English machines translation thereof.
Office Action mailed Jun. 6, 2023, issued for TW108141322 and English translation thereof.
Office Action dated Jul. 11, 2022, issued for German File No. 11 2019 005 802.9 and a mahine English translation thereof.

* cited by examiner

*Primary Examiner* — Anthony J Green
(74) *Attorney, Agent, or Firm* — Locke Lord LLP; James E. Armstrong, IV; Nicholas J. DiCeglie, Jr.

(57) ABSTRACT

Provided is a fiber sizing agent including a vinyl ester resin (A), an epoxy compound (B), and an aqueous medium. The vinyl ester resin (A) has an alkoxy polyoxyalkylene structure and a urethane linkage. The fiber sizing agent exhibits excellent binding ability for various fibers, such as glass fibers and carbon fibers. Molded articles produced from a molding material including the fiber sizing agent have various excellent physical properties, and examples of the physical properties include flexural strength, compressive strength, and interlaminar shear strength. Accordingly, the molded articles can be used, for example, in automotive parts, aircraft parts, windmill parts, industrial parts, and the like.

16 Claims, No Drawings

FIBER SIZING AGENT, FIBER MATERIAL, MOLDING MATERIAL, AND MOLDED ARTICLE

TECHNICAL FIELD

The present invention relates to a fiber sizing agent useful for binding fibers together and also relates to a fiber material, a molding material, and a molded article.

BACKGROUND ART

Fiber-reinforced plastics, which include a matrix resin, such as an epoxy resin or a vinyl ester resin (epoxy acrylate), and include a glass fiber, a carbon fiber, or the like, are used in automotive members, aircraft members, and the like, which are required to have high strength and excellent durability.

In many cases, the glass fiber or the carbon fiber that is used in fiber-reinforced plastics is typically a fiber material including several thousand to several tens of thousand of fibers bound together by a fiber sizing agent. A purpose of using such a material is to provide high strength.

A known example of the fiber sizing agent is one including an aliphatic epoxy compound and a compound that contains a terminal unsaturated group and a polar group in a molecule (see, for example, PTL 1). Unfortunately, problems were encountered in that the fiber sizing agent did not have sufficient binding ability for carbon fibers, and molded articles produced from a molding material in which carbon fibers treated with the fiber sizing agent were used did not have sufficient strength.

CITATION LIST

Patent Literature

PTL 1: Japanese Unexamined Patent Application Publication No. 2015-7300

SUMMARY OF INVENTION

Technical Problem

An object of the present invention is to provide a fiber sizing agent that has excellent fiber binding ability and which enables the production of a molded article that has various excellent physical properties, and examples of the physical properties include flexural strength, compressive strength, and interlaminar shear strength. Another object of the present invention is to provide a fiber material, a molding material, and a molded article produced therefrom.

Solution to Problem

The present inventors performed studies to achieve the objects described above and discovered that the objects can be achieved with a fiber sizing agent, which includes a vinyl ester resin, an epoxy compound, and an aqueous medium, with the vinyl ester resin having a specific structure. Accordingly, the present invention was completed.

Specifically, the present invention relates to a fiber sizing agent including a vinyl ester resin (A), an epoxy compound (B), and an aqueous medium. The vinyl ester resin (A) has an alkoxy polyoxyalkylene structure and a urethane linkage.

Advantageous Effects of Invention

The fiber sizing agent of the present invention can be used to produce a fiber material that can impart excellent strength to a molded article, and the fiber sizing agent has excellent fiber binding ability. Hence, the fiber sizing agent is suitable for use as a sizing agent for glass fibers, carbon fibers, and the like.

DESCRIPTION OF EMBODIMENTS

A fiber sizing agent of the present invention includes a vinyl ester resin (A), an epoxy compound (B), and an aqueous medium. The vinyl ester resin (A) has an alkoxy polyoxyalkylene structure and a urethane linkage.

The vinyl ester resin (A) will be described. The vinyl ester resin (A) has an alkoxy polyoxyalkylene structure, and the alkoxy polyoxyalkylene structure is a structure in which one end of the polyoxyalkylene chain is capped with an alkoxy group.

Examples of the polyoxyalkylene chain include polyoxyethylene chains, polyoxypropylene chains, and polyoxybutylene chains and also include those in which two or more of the foregoing chains are arranged in a block or random manner.

Examples of the alkoxy group that caps one end of the polyoxyalkylene chain include methoxy groups, ethoxy groups, propoxy groups, and butoxy groups.

The alkoxy polyoxyalkylene structure may be one containing, in the structure, oxyethylene unit structures in an amount greater than or equal to 35 mass %. This is preferable because, in such a case, water dispersibility is further enhanced.

Furthermore, the alkoxy polyoxyalkylene structure may be one having a number average molecular weight of 300 to 7000. This is preferable because, in such a case, the water dispersibility is further enhanced.

The alkoxy polyoxyalkylene structure may be present in an amount ranging from 3 to 60 mass % in the vinyl ester resin (A). This is preferable because, in such a case, the water dispersibility is further enhanced. More preferably, the alkoxy polyoxyalkylene structure may be present in an amount ranging from 10 to 55 mass %.

The vinyl ester resin (A) includes, at an end thereof, a (meth)acryloyl group. A (meth)acryloyl equivalent weight of the vinyl ester resin (A) may be within a range of 500 to 3000 g/eq. This is preferable because, in such a case, the binding ability is enhanced, and a molded article having higher strength can be obtained. More preferably, the (meth)acryloyl equivalent weight may be within a range of 800 to 200 g/eq.

In the present invention, "(meth)acryloyl" refers to one or both of "acryloyl" and "methacryloyl"; "(meth)acrylic acid" refers to one or both of "acrylic acid" and "methacrylic acid"; "(meth)acrylate" refers to one or both of "acrylate" and "methacrylate"; and "acid (anhydride)" refers to one or both of "acid" and "acid anhydride".

Furthermore, the vinyl ester resin (A) may be one having a structure derived from a bisphenol A epoxy resin. This is preferable because, in such a case, the binding ability is enhanced, and a molded article having higher strength can be obtained.

The vinyl ester resin (A) can be obtained, for example, by reacting a urethane resin (a1) having an alkoxy polyoxyalkylene structure and an epoxy group with (meth)acrylic acid and/or (meth)acrylic acid anhydride (a2).

It is preferable that the reaction between the epoxy group of the urethane resin (a1) and the (meth)acrylic acid and/or (meth)acrylic acid anhydride (a2) be carried out at a temperature of 60 to 140° C. with an esterification catalyst. Furthermore, a polymerization inhibitor and/or the like may be used.

The urethane resin (a1) has an epoxy group, and an epoxy equivalent weight of the urethane resin (a1) may be within a range of 250 to 2000 g/eq. This is preferable because, in such a case, the binding ability is enhanced, and a molded article having higher strength can be obtained.

The urethane resin (a1) can be produced, for example, by reacting a compound (a1-1), a polyisocyanate (a1-2), and a polyoxyalkylene monoalkyl ether (a1-3) together, the compound (a1-1) having an epoxy group and a hydroxy group, in the absence of a solvent or in the presence of an organic solvent, by using a method known in the art; if necessary, a polyol (a1-4), which is different from the compound (a1-1), and a chain extender (a1-5) may be reacted together. Specifically, it is preferable that the reaction be carried out at a reaction temperature of 50 to 120° C. for 1 to 15 hours so as to ensure safety.

The compound (a1-1) that has an epoxy group and a hydroxy group may be, for example, a hydroxy-group-containing epoxy resin.

Examples of the epoxy resin include bisphenol A epoxy resins, bisphenol F epoxy resins, phenol novolac epoxy resins, ethyl phenol novolac epoxy resins, butyl phenol novolac epoxy resins, octyl phenol novolac epoxy resins, cresol novolac epoxy resins, such as ortho-cresol novolac epoxy resins, resorcinol novolac epoxy resins, bisphenol A novolac epoxy resins, bisphenol F novolac epoxy resins, bisphenol AD novolac epoxy resins, and bisphenol S novolac epoxy resins. The epoxy resin may be a phenol novolac epoxy resin, a cresol novolac epoxy resin, or a bisphenol A epoxy resin. This is preferable because, in such a case, the binding ability is enhanced, and a molded article having higher strength can be obtained. More preferably, the epoxy resin may be a bisphenol A epoxy resin. Note that these epoxy resins may be used alone or in a combination of two or more.

Preferably, the compound (a1-1) may be a hydroxy-group-containing phenol novolac epoxy resin, a hydroxy-group-containing cresol novolac epoxy resin, or a hydroxy-group-containing bisphenol A epoxy resin. Among these, a hydroxy-group-containing bisphenol A epoxy resin is more preferable because, with this resin, the binding ability is enhanced, and a molded article having higher strength can be obtained.

Preferably, the compound (a1-1) may be a compound having an epoxy equivalent weight of 150 to 2000 g/eq, more preferably, a compound having an epoxy equivalent weight of 150 to 900 g/eq, and even more preferably, a compound having an epoxy equivalent weight of 150 to 500 g/eq.

The hydroxy groups of the compound (a1-1) may be present in an amount ranging from 5 to 150 mol % relative to total moles of the epoxy groups of the urethane resin (A). This is preferable because, in such a case, the binding ability is enhanced, and a molded article having higher strength can be obtained. More preferably, the hydroxy groups may be present in an amount ranging from 5 to 130 mol %, and even more preferably, in an amount ranging from 5 to 120 mol %.

Examples of the polyisocyanate (a1-2) include aromatic polyisocyanates, such as 1,3- and 1,4-phenylene diisocyanate, 1-methyl-2,4-phenylene diisocyanate (2,4-TDI), 1-methyl-2,6-phenylene diisocyanate (2,6-TDI), 1-methyl-2,5-phenylene diisocyanate, 1-methyl-2,6-phenylene diisocyanate, 1-methyl-3,5-phenylene diisocyanate, 1-ethyl-2,4-phenylene diisocyanate, 1-isopropyl-2,4-phenylene diisocyanate, 1,3-dimethyl-2,4-phenylene diisocyanate, 1,3-dimethyl-4,6-phenylene diisocyanate, 1,4-dimethyl-2,5-phenylene diisocyanate, diethylbenzene diisocyanate, diisopropylbenzene diisocyanate, 1-methyl-3,5-diethylbenzene diisocyanate, 3-methyl-1,5-diethylbenzene-2,4-diisocyanate, 1,3,5-triethylbenzene-2,4-diisocyanate, naphthalene-1,4-diisocyanate, naphthalene-1,5-diisocyanate, 1-methyl-naphthalene-1,5-diisocyanate, naphthalene-2,6-diisocyanate, naphthalene-2,7-diisocyanate, 1,1-dinaphthyl-2,2'-diisocyanate, biphenyl-2,4'-diisocyanate, biphenyl-4,4'-diisocyanate, 3-3'-dimethyl-biphenyl-4,4'-diisocyanate, diphenylmethane-4,4'-diisocyanate, diphenylmethane-2,2'-diisocyanate, and diphenylmethane-2,4-diisocyanate; aliphatic polyisocyanates, such as tetramethylene diisocyanate, 1,6-hexamethylene diisocyanate (HDI), dodecamethylene diisocyanate, trimethylhexamethylene diisocyanate, and lysine diisocyanate; alicyclic polyisocyanates, such as 1,3-cyclopentylene diisocyanate, 1,3-cyclohexylene diisocyanate, 1,4-cyclohexylene diisocyanate, 1,3-di(isocyanatomethyl)cyclohexane, 1,4-di(isocyanatomethyl)cyclohexane, isophorone diisocyanate (IPDI), 4,4'-dicyclohexylmethane diisocyanate, 2,4'-dicyclohexylmethane diisocyanate, 2,2'-dicyclohexylmethane diisocyanate, and 3,3'-dimethyl-4,4'-dicyclohexylmethane diisocyanate; and trimers of any of the foregoing polyisocyanates.

The polyoxyalkylene monoalkyl ether (a1-3) is one represented by general formula (1) below.

[Chem. 1]

(1)

In the formula, $R^1$ is an alkylene group, $R^2$ is an alkylene group, and n is an integer greater than or equal to 1.

Regarding the polyoxyalkylene monoalkyl ether (a1-3), $R^1$ of general formula (1) may be a methyl group, an ethyl group, a propyl group, or a butyl group. This is preferable because, in such a case, storage stability is further enhanced. More preferably, $R^1$ may be a methyl group.

Furthermore, $R^2$ of general formula (1) may be an ethylene group or a propylene group. This is preferable because, in such a case, the storage stability and the fiber binding ability are further enhanced. More preferably, $R^2$ may be an ethylene group.

Further, n of general formula (1) may be an integer of 5 to 150. This is preferable because, in such a case, the storage stability, the fiber binding ability, and a strength of a resulting molded article are further enhanced. More preferably, n may be an integer of 5 to 100.

Furthermore, the polyoxyalkylene monoalkyl ether (a1-3) may be one having a hydroxy number within a range of 10 to 200. This is preferable because, in such a case, the storage stability is further enhanced. More preferably, the hydroxy number is within a range of 15 to 200.

The polyoxyalkylene monoalkyl ether (a1-3) may be a polyoxyethylene monoalkyl ether. This is more preferable because, in such a case, the storage stability and the fiber binding ability are further enhanced. Particularly preferably, the polyoxyalkylene monoalkyl ether (a1-3) may be a polyoxyethylene monomethyl ether.

Examples of the polyol (a1-4) include polyether polyols, polycarbonate polyols, polyester polyols, ethylene glycol, 1,2-propanediol, 1,3-butanediol, 1,4-butanediol, 3-methyl-1,5-pentanediol, 1,6-hexanediol, 1,4-cyclohexanedimethanol, neopentyl glycol, diethylene glycol, dipropylene glycol, glycerol, trimethylolpropane, acrylic polyols in which hydroxy groups are introduced in an acrylic copolymer, polybutadiene polyols, which are copolymers of butadiene and have hydroxy groups in a molecule, hydrogenated polybutadiene polyols, and partially saponified products of an ethylene-vinyl acetate copolymer.

Examples of the polyether polyols include polyols obtained by addition-polymerizing an alkylene oxide with one or more compounds having two or more active hydrogen atoms, which are used as initiators.

Furthermore, examples of the polycarbonate polyols include polyols obtained by reacting a carbonic acid ester with a polyol; and polyols obtained by reacting phosgene with bisphenol A or the like.

Furthermore, examples of the polyester polyols include polyester polyols obtained by subjecting a low-molecular-weight polyol and a polycarboxylic acid to an esterification reaction; polyesters obtained by subjecting a cyclic ester compound, such as ε-caprolactone or γ-butyrolactone, to a ring-opening polymerization reaction; and copolymerized polyesters in which any of these is included.

The polyether polyols, the polycarbonate polyols, and the aliphatic polyester polyols may be preferably ones having a number average molecular weight of 300 to 4000 and more preferably ones having a number average molecular weight of 500 to 2000.

The chain extender (a1-5) may be, for instance, a polyamine or a different compound having active hydrogen atoms.

Examples of the polyamine include diamines, such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexane diamine; N-hydroxymethylaminoethylamine, N-hydroxyethylaminoethylamine, N-hydroxypropylaminopropylamine, N-ethylaminoethylamine, N-methylaminopropylamine; diethylenetriamine, dipropylenetriamine, triethylenetetramine; hydrazine, N,N'-dimethylhydrazine, 1,6-hexamethylenebishydrazine; succinic acid dihydrazide, adipic acid dihydrazide, glutaric acid dihydrazide, sebacic acid dihydrazide, isophthalic acid dihydrazide; β-semicarbazide propionic acid hydrazide, 3-semicarbazide propyl carbazate, and semicarbazide-3-semicarbazide methyl-3,5,5-trimethylcyclohexane.

Examples of the different compound having active hydrogen include glycol compounds, such as ethylene glycol, diethylene glycol, triethylene glycol, propylene glycol, 1,3-propanediol, 1,3-butanediol, 1,4-butanediol, hexamethylene glycol, sucrose, methylene glycol, glycerol, and sorbitol; phenolic compounds, such as bisphenol A, 4,4'-dihydroxydiphenyl, 4,4'-dihydroxydiphenyl ether, 4,4'-dihydroxydiphenyl sulfone, hydrogenated bisphenol A, and hydroquinone; and water.

Preferably, the chain extender (a1-5) may be used, for example, within a range in which an equivalent ratio between the amino groups of a polyamine and excess isocyanate groups is less than or equal to 1.9 (equivalent ratio), and more preferably, within a range in which the equivalent ratio is 0.3 to 1.0 (equivalent ratio).

The urethanization reaction may be carried out in the absence of a catalyst or in the presence of a known catalyst, examples of which include tin compounds, such as stannous octoate, dibutyltin dilaurate, dibutyltin dimaleate, dibutyltin diphthalate, dibutyltin dimethoxide, dibutyltin diacetylacetate, and dibutyltin diversatate; titanate compounds, such as tetrabutyl titanate, tetraisopropyl titanate, and triethanolamine titanate; tertiary amine compounds; and quaternary ammonium salts.

With regard to the epoxy compound (B), examples thereof include glycidyl ethers of phenols, examples of which include bisphenol-type epoxy resins, such as bisphenol A epoxy resins, bisphenol F epoxy resins, bisphenol fluorene epoxy resins, and biscresol fluorene types, novolac-type epoxy resins, such as phenol novolac epoxy resins and cresol novolac epoxy resins, oxazolidone-modified epoxy resins, and brominated epoxy resins of any of the foregoing resins; glycidyl ethers of polyhydric alcohols, such as dipropylene glycol diglycidyl ether, trimethylolpropane triglycidyl ether, diglycidyl ethers of alkylene oxide adducts of bisphenol A, and diglycidyl ethers of hydrogenated bisphenol A; cycloaliphatic epoxy resins, such as 3,4-epoxy-6-methylcyclohexylmethyl-3,4-epoxy-6-methylcyclohexanecarboxylate, and 1-epoxyethyl-3,4-epoxycyclohexane; glycidyl esters, such as phthalic acid diglycidyl ester, tetrahydrophthalic acid diglycidyl ester, diglycidyl-p-hydroxybenzoic acid, and dimer acid glycidyl ester; glycidyl amines, such as tetraglycidyl diaminodiphenylmethane, tetraglycidyl-m-xylenediamine, triglycidyl-p-aminophenol, and N,N-diglycidylaniline; and heterocyclic epoxy resins, such as 1,3-diglycidyl-5,5-dimethylhydantoin and triglycidyl isocyanurate. One or more modified products of any of these epoxy compounds may be used. Such products may be obtained by using any of a variety of modification methods. Examples of such products include epoxy compounds having an alkoxy polyoxyalkylene structure and epoxy compounds having an alkoxy polyoxyalkylene structure and a urethane linkage. Among such products, aromatic epoxy compounds, which contain an aromatic ring, are preferable. This is because aromatic epoxy compounds can be easily coemulsified with the vinyl ester resin (A), have higher affinity (compatibility) for a molding material, and enhance the handleability of a molding material, the flowability of a molding material during molding, and a strength of a molded article. Note that these epoxy compounds may be used alone or in a combination of two or more.

A mass ratio (A:B) between the vinyl ester resin (A) and the epoxy compound (B) may be within a range of 95:5 to 40:60. This is preferable because, in such a case, a strength of a resulting molded article is further enhanced. More preferably, the mass ratio (A:B) may be within a range of 90:10 to 60:40.

The aqueous medium may be water, a water-miscible organic solvent, or a mixture thereof. Examples of the water-miscible organic solvent include alcohol compounds, such as methanol, ethanol, and isopropanol; ketone compounds, such as acetone and methyl ethyl ketone; polyalkylene glycol compounds, such as ethylene glycol, diethylene glycol, and propylene glycol; alkyl ether compounds of polyalkylene glycol; and lactam compounds, such as N-methyl-2-pyrrolidone. In the present invention, water may be used alone, a mixture of water and a water-miscible organic solvent may be used, or a water-miscible organic solvent may be used alone. From the standpoint of safety and environmental impact, it is preferable that water be used alone, or a mixture of water and a water-miscible organic solvent be used. It is particularly preferable that water be used alone.

The fiber sizing agent of the present invention includes the vinyl ester resin (A), the epoxy compound (B), and the aqueous medium. It is preferable that the fiber sizing agent be an aqueous dispersion in which the vinyl ester resin (A) and the epoxy compound (B) are dispersed in the aqueous medium.

The fiber sizing agent of the present invention can be obtained, for example, by mixing and stirring a mixed solution of the vinyl ester resin (A) and the epoxy compound (B) with an emulsifier, subsequently mixing the mixture with the aqueous medium, and then, if necessary, removing an organic solvent.

Examples of the emulsifier include polyoxyalkylene alkyl ethers, polyoxyalkylene phenyl ethers, polyoxyalkylene alkyl phenyl ethers, polyoxyalkylene benzyl phenyl ethers, polyoxyalkylene styryl phenyl ethers, polyoxyalkylene cumyl phenyl ethers, polyoxyalkylene naphthyl phenyl ethers, polyoxyalkylene fatty acid esters, polyoxyethylene-polyoxypropylene block copolymers, and polyethylene glycol. Among these, polyoxyalkylene alkyl ethers, polyoxyalkylene styryl phenyl ethers, polyoxyethylene-polyoxypropylene block copolymers are preferable because, with any of these, a strength of a resulting molded article is further enhanced; polyoxyalkylene alkyl ethers, polyoxyalkylene styryl phenyl ethers are more preferable. These emulsifiers may be used alone or in a combination of two or more.

Examples of the polyoxyalkylene alkyl ether ethers include polyoxyethylene alkyl ethers, such as polyoxyethylene hexyl ether, polyoxyethylene octyl ether, polyoxyethylene nonyl ether, polyoxyethylene lauryl ether, polyoxyethylene stearyl ether, and polyoxyethylene eicosyl ether; and alkyl ethers of a polyoxyethylene-polyoxypropylene copolymer, such as hexyl ethers of a polyoxyethylene-polyoxypropylene copolymer, octyl ethers of a polyoxyethylene-polyoxypropylene copolymer, nonyl ethers of a polyoxyethylene-polyoxypropylene copolymer, lauryl ethers of a polyoxyethylene-polyoxypropylene copolymer, stearyl ethers of a polyoxyethylene-polyoxypropylene copolymer, and eicosyl ethers of a polyoxyethylene-polyoxypropylene copolymer. Among these, ethers with an alkyl group having 8 to 18 carbon atoms, that is, polyoxyethylene octyl ether, polyoxyethylene nonyl ether, polyoxyethylene lauryl ether, polyoxyethylene stearyl ether, and the like, are particularly preferable because, with any of these, an emulsifying property is enhanced. These polyoxyalkylene alkyl ethers may be used alone or in a combination of two or more.

Examples of the polyoxyalkylene styryl phenyl ethers include polyoxyethylene styryl phenyl ethers having 1 to 3 moles of styrene added, such as polyoxyethylene monostyryl phenyl ether, polyoxyethylene distyryl phenyl ether, and polyoxyethylene tristyryl phenyl ether; and styryl phenyl ethers of a polyoxyethylene-polyoxypropylene copolymer having 1 to 3 moles of styrene added. Polyoxyethylene styryl phenyl ethers having 1 to 3 moles of styrene added are preferable because, with any of these, an emulsifying property is enhanced. These polyoxyalkylene styryl ethers may be used alone or in a combination of two or more.

The polyoxyethylene-polyoxypropylene block copolymers may be ones having an average molecular weight ranging from 1000 to 30000. This is preferable because, in such a case, an emulsifying property is enhanced. More preferably, the polyoxyethylene-polyoxypropylene copolymer may be one having an average molecular weight ranging from 5000 to 20000. Furthermore, preferably, a content of the polyoxyethylene may be within a range of 40 to 90 mass % and more preferably within a range of 50 to 80 mass %.

In the fiber sizing agent of the present invention, a mass percentage of the aqueous medium may be within a range of 10 to 98 mass %. This is preferable because, in such a case, the storage stability and runnability are further enhanced. More preferably, the mass percentage may be within a range of 20 to 90 mass %.

In the fiber sizing agent of the present invention, a mass percentage of the solids may be within a range of 2 to 80 mass %. This is preferable because, in such a case, the storage stability and the runnability are further enhanced. More preferably, the mass percentage may be within a range of 10 to 70 mass %.

Furthermore, if necessary, the fiber sizing agent of the present invention may be used in combination with one or more additives, such as a silane coupling agent, a curing catalyst, a lubricant, a filler, a thixotropic agent, a tackifier, a wax, a heat stabilizer, a light stabilizer, a fluorescent brightener, and a foaming agent, and/or, in combination with one or more of the following: a pH adjusting agent, a leveling agent, an anti-gelling agent, a dispersion stabilizer, an antioxidant, a radical scavenger, a heat-resistance-imparting agent, an inorganic filler, an organic filler, a plasticizer, a reinforcing agent, a catalyst, an antimicrobial agent, an antifungal agent, a corrosion inhibitor, a thermoplastic resin, a thermosetting resin, a pigment, a dye, a conductive agent, an antistatic agent, a moisture permeability enhancing agent, a water repellent, an oil repellent, a hollow foam, a compound containing water of crystallization, a flame retardant, a water absorbent, a moisture absorbent, a deodorant, a foam stabilizing agent, a defoaming agent, an antibacterial agent, a preservative, an algae inhibitor, a pigment dispersing agent, an anti-blocking agent, and a hydrolysis inhibitor.

In particular, in instances where the fiber sizing agent of the present invention is used as a sizing agent for glass fibers, it is preferable that a silane coupling agent be used in combination, in terms of further enhancing the adhesive strength of the sizing agent with respect to the glass fibers.

Examples of the silane coupling agent include γ-(2-aminoethyl)aminopropyltrimethoxysilane, γ-(2-hydroxylethyl)aminopropyltrimethoxysilane, γ-(2-aminoethyl)aminopropyltriethoxysilane, γ-(2-hydroxylethyl)aminopropyltriethoxysilane, γ-(2-aminoethyl)aminopropylmethyldimethoxysilane, aminopropylmethyldimethoxysilane, γ-(2-aminoethyl)aminopropylmethyldiethoxysilane, γ-(2-hydroxylethyl)aminopropylmethyldimethoxysilane, γ-(2-hydroxylethyl)aminopropylmethyldiethoxysilane, γ-(N,N-di-2-hydroxylethyl)aminopropyltriethoxysilane, γ-aminopropyltrimethoxysilane, γ-aminopropyltriethoxysilane, γ-aminopropylmethyldimethoxysilane, γ-aminopropylmethyldiethoxysilane, γ-(N-phenyl)aminopropyltrimethoxysilane, γ-mercaptopropyltrimethoxysilane, and γ-mercaptophenyltrimethoxysilane.

Preferably, the silane coupling agent may be used in an amount ranging from 1 to 30 parts by mass per 100 parts by mass of the total resin components of the fiber sizing agent.

Furthermore, the fiber sizing agent of the present invention may be used in combination with, for example, an emulsion, a latex, a water-soluble resin, and/or the like. The emulsion may be a vinyl acetate-based emulsion, an ethylene vinyl acetate-based emulsion, an acrylic-based emulsion, an epoxy-based emulsion, a urethane-based emulsion, a polyester-based emulsion, a polyamide-based emulsion, or the like. The latex may be a styrene-butadiene-based latex, an acrylonitrile-butadiene-based latex, an acrylic-butadiene-based latex, or the like. The water-soluble resin may be poval, cellulose, or the like.

The fiber sizing agent of the present invention may be used for binding and/or surface treatment of fibers for the purpose of, for example, preventing fiber breakage, scuffing, and the like of glass fibers, carbon fibers, and the like.

Examples of fiber materials that can be treated with the fiber sizing agent of the present invention include glass fibers, carbon fibers, silicon carbide fibers, pulp fibers, hemp fibers, cotton fibers, nylon fibers, polyester fibers, acrylic fibers, polyurethane fibers, polyimide fibers, and polyamide fibers made of an aramid material, such as Kevlar or Nomex. Among these, glass fibers and carbon fibers are preferable because these fibers have high strength.

Examples of glass fibers that can be treated with the fiber sizing agent include fibers produced from a material such as alkali-containing glass, low-alkali glass, or alkali-free glass. In particular, alkali-free glass (E-glass), which has low susceptibility to aging degradation and has stable mechanical properties, is preferable.

Furthermore, carbon fibers that can be treated with the fiber sizing agent include, in general, carbon fibers such as polyacrylonitrile-based fibers and pitch-based fibers. In particular, the carbon fibers may be polyacrylonitrile-based carbon fibers; this is preferable in terms of providing excellent strength.

Furthermore, the carbon fibers may be ones having an individual fiber diameter of 0.5 to 20 μm. This is preferable in terms of providing even higher strength and the like. More preferably, the carbon fibers may be ones having an individual fiber diameter of 2 to 15 μm.

Examples of the carbon fibers include those produced by a twisting process, those produced by a combining process, those produced by a spinning process, and those produced by a non-woven process. Furthermore, the carbon fibers may be in the form of any of the following: filaments, a yarn, a roving, strands, chopped strands, a felt, a needle punched fabric, a cloth, a roving cloth, milled fibers, and the like.

A method for forming a bundle of the glass fibers or the carbon fibers by using the fiber sizing agent of the present invention so as to form a coating on a surface of the glass fiber bundle or the carbon fiber bundle may be as follows, for example: the fiber sizing agent is uniformly applied to the surface of the fibers by using a known method, examples of which include a kiss coating process, a roller process, a dipping process, a spraying process, and a brushing process. In instances where the fiber sizing agent includes an aqueous medium and/or an organic solvent as a solvent, it is preferable that heat drying be performed after the application, by using a heated roller, a hot air stream, a hot plate, or the like.

A coating amount of the coating formed on the surface of the fibers is preferably 0.1 to 5 mass % and more preferably 0.3 to 1.5 mass %, relative to a total mass of the fiber bundle, which is in the form of a bundle and surface-treated.

A fiber material of the present invention produced by the above-described method, which is in the form of a bundle and surface-treated, may be used in combination with a matrix resin and the like, which will be described below, to form a molding material for producing a molded article having high strength.

In cases where a molded article or the like is formed by using the fiber material of the present invention in combination with a matrix resin, adhesion at the interface between the fiber and the matrix resin is significantly enhanced. Hence, the fiber material can enhance the strength of a molded article.

Examples of the matrix resin that may be used in a molding material of the present invention include thermosetting resins and thermoplastic resins. Examples of the thermosetting resins include phenolic resins, polyimide resins, bismaleimide resins, unsaturated polyester resins, epoxy resins, vinyl ester resins, and vinyl urethane resins. Examples of the thermoplastic resins include saturated polyester resins, such as polyethylene terephthalate and polybutylene terephthalate, polypropylene, polystyrene, polycarbonate, polyphenylene sulfide, polyphenylene oxide, polyamide resins, such as 6-nylon and 6,6-nylon, acrylonitrile-styrene copolymers, acrylonitrile-butadiene-styrene copolymers, polyacetal, polyetherimide, and polyetheretherketone.

The matrix resin may be a thermosetting resin. This is preferable because, with a thermosetting resin, a molded article having higher strength can be obtained. More preferably, the matrix resin may be a vinyl ester resin or an unsaturated polyester resin.

The molding material of the present invention includes the fiber material and the matrix resin and optionally includes a polymerizable monomer and/or the like. For example, a molded article having higher strength can be obtained by using any of a variety of molding methods, examples of which include hand lay-up processes, spray-up processes, FRP lining processes, resin transfer molding processes (RTM processes), resin injection processes (RI processes), vacuum-assisted resin transfer molding processes (VARTM processes), infusion molding processes, press molding processes, autoclave molding processes, filament winding processes, and pultrusion molding processes. For example, for the molding, a material in the form of a prepreg or a sheet molding compound (SMC) may be used.

The prepreg may be produced, for example, by coating the matrix resin onto release paper, placing the surface-treated fiber material on the coated surface, and, if necessary, performing pressing and impregnation by using a roller or the like.

In the production of the prepreg, it is preferable to use an epoxy resin, a vinyl ester resin, or the like as the matrix resin. The epoxy resin may be a bisphenol A epoxy resin, a glycidyl amine epoxy resin, such as tetraglycidyl aminodiphenylmethane, a novolac-type epoxy resin, or the like.

Furthermore, the sheet molding compound can be produced, for example, by sufficiently impregnating the surface-treated fiber material with a mixture of the matrix resin and a polymerizable unsaturated monomer, such as styrene, and then, for instance, processing the resultant into a sheet. In the production of the sheet molding compound, it is preferable to use an unsaturated polyester resin, a vinyl ester resin, or the like as the matrix resin.

The curing of the molding material can be carried out, for example, by initiating a radical polymerization by heating or light irradiation under high or normal pressure. In this instance, a known thermal curing agent or photocuring agent, for instance, may be additionally used.

Further examples of the molding material include those obtained by, for instance, kneading together a thermoplastic resin and the surface-treated fiber material under heat. Such molding materials may be subjected to secondary processing, which may be, for example, injection molding or the like.

Furthermore, the prepreg including a thermoplastic resin can be produced, for example, by laying the surface-treated fiber material so as to form a sheet and then impregnating the thermoplastic resin, which has been melted, into the fiber material.

For example, one or more prepregs including a thermoplastic resin may be stacked and then be subjected to secondary processing, which may involve, for instance, heating and molding under high or normal pressure.

Molded articles produced with the molding material have high strength and, therefore, can be used, for example, in automotive parts, aircraft parts, windmill parts, industrial parts, and the like.

EXAMPLES

The present invention will now be described in more detail with reference to Examples. Note that the average molecular weight of the resins was measured under the GPC measurement conditions described below.
[GPC Measurement Conditions]
Measuring Instrument: high-performance GPC instrument (HLC-8220GPC, manufactured by Tosoh Corporation)
Columns: the following columns, manufactured by Tosoh Corporation, were connected in series and used.
TSKgel G5000 (7.8 mm I.D.×30 cm)×1
TSKgel G4000 (7.8 mm I.D.×30 cm)×1
TSKgel G3000 (7.8 mm I.D.×30 cm)×1
TSKgel G2000 (7.8 mm I.D.×30 cm)×1
Detector: RI (differential refractometer)
Column temperature: 40° C.
Eluent: tetrahydrofuran (THF)
Flow rate: 1.0 mL/min
Injection volume: 100 μL (a tetrahydrofuran solution with a sample concentration of 4 mg/mL)
Standard: a standard curve was generated by using the following monodisperse polystyrene.
(Monodisperse Polystyrene)
TSKgel standard polystyrene A-500, manufactured by Tosoh Corporation
TSKgel standard polystyrene A-1000, manufactured by Tosoh Corporation
TSKgel standard polystyrene A-2500, manufactured by Tosoh Corporation
TSKgel standard polystyrene A-5000, manufactured by Tosoh Corporation
TSKgel standard polystyrene F-1, manufactured by Tosoh Corporation
TSKgel standard polystyrene F-2, manufactured by Tosoh Corporation
TSKgel standard polystyrene F-4, manufactured by Tosoh Corporation
TSKgel standard polystyrene F-10, manufactured by Tosoh Corporation
TSKgel standard polystyrene F-20, manufactured by Tosoh Corporation
TSKgel standard polystyrene F-40, manufactured by Tosoh Corporation
TSKgel standard polystyrene F-80, manufactured by Tosoh Corporation
TSKgel standard polystyrene F-128, manufactured by Tosoh Corporation
TSKgel standard polystyrene F-288, manufactured by Tosoh Corporation
TSKgel standard polystyrene F-550, manufactured by Tosoh Corporation Synthesis Example 1: Synthesis of Epoxy Compound (B-1)

124 parts by mass of polyethylene glycol (moles of ethylene oxide added: 12), 45 parts by mass of polyoxyethylene monomethyl ether (moles of ethylene oxide added: 12), and 179 parts by mass of methyl ethyl ketone were added to a four-neck flask equipped with a thermometer, a stirrer, a reflux condenser, and a dropping funnel, and dissolution was performed. Subsequently, 100 parts by mass of diphenylmethane diisocyanate (Millionate MT, manufactured by Tosoh Corporation) was added and allowed to react at 80° C. for 2 hours. Thereafter, 150 parts by mass of a bisphenol A epoxy resin (Epiclon 1050, manufactured by DIC Corporation, an epoxy equivalent weight: 477 g/eq), which contained hydroxy groups, was added, and a further reaction was allowed to proceed. The disappearance of isocyanate groups in the reaction solution was confirmed by using an infrared absorption spectrum, and, accordingly, a solution (solids content: 70%, and an epoxy equivalent weight: 1360 g/eq) of an aromatic epoxy compound having a methoxy polyoxyethylene structure and an epoxy group was obtained. The epoxy compound had a weight average molecular weight of 12000. To the solution, 40 parts by mass of a nonionic emulsifier (polyoxyethylene (70 mol) styrenated (5 mol) cumylphenol (mass ratio: 90:10) was added, and the contents were thoroughly stirred. Thereafter, 1360 parts by mass of ion exchanged water was added dropwise over 30 minutes, and the contents were mixed with stirring for another 15 minutes. The aqueous dispersion was concentrated by distillation under reduced pressure, and, accordingly, an aqueous dispersion (solids content: 30%) of an epoxy compound (B-1) was obtained.

Synthesis Example 2: Synthesis of Vinyl Ester Resin (X)

620 parts by mass of a phenol novolac epoxy resin (Epiclon N-740-80M, manufactured by DIC Corporation, an epoxy equivalent weight of the solids: 180 g/eq, and active ingredients: 80%), 205 parts by mass of acrylic acid, 1 part by mass of t-butyl hydroquinone, and 10 parts by mass of 2-methylimidazole were loaded into a four-neck flask equipped with a thermometer, a stirrer, a reflux condenser, and a dropping funnel and thoroughly stirred at 40° C. to achieve dissolution. Subsequently, the solution was heated to a temperature of 75 to 80° C. under a flow of a gas in which nitrogen and air were mixed in a ratio of 1:1. A reaction was allowed to proceed at a temperature of 75 to 80° C. for 10 hours, and, consequently, an acid number of 1 or less (mg KOH/g) was reached. The reaction was then stopped, and, accordingly, a vinyl ester resin (X) was obtained.

Example 1: Production and Evaluation of Fiber Sizing Agent (1)

124 parts by mass of polyoxyethylene monoethyl ether (Uniox M-550, manufactured by NOF Corporation, a hydroxy number: 100), 99 parts by mass of a bisphenol A epoxy resin (Epiclon 1050, manufactured by DIC Corporation, an epoxy equivalent weight: 477 g/eq), and 65 parts by mass of methyl ethyl ketone were added to a four-neck flask equipped with a thermometer, a stirrer, a reflux condenser, and a dropping funnel and thoroughly stirred at 40° C. to achieve dissolution. Thereafter, 38 parts by mass of tolylene diisocyanate was added at 40° C. and allowed to react at a temperature of 60 to 65° C. for 6 hours. The disappearance of the 2260 cm$^{-1}$ characteristic peak of NCO was confirmed by using an infrared absorption spectrum. Subsequently, the solution was cooled to 40° C., and then 15 parts by mass of acrylic acid, 1 part by mass of t-butyl hydroquinone, and 3 parts by mass of 2-methylimidazole were loaded. The contents were then heated to a temperature of 75 to 80° C. under a flow of a gas in which nitrogen and air were mixed in a ratio of 1:1. A reaction was allowed to proceed at a temperature of 75 to 80° C. for 10 hours, and, consequently, an acid number of 1 or less (mg KOH/g) was reached. The reaction was then stopped, and, accordingly, a solution of a vinyl ester resin (A-1) was obtained. The vinyl ester resin (A-1) had a weight average molecular weight of 13000.

Thereafter, the solution was cooled to 40° C., and then 465 parts by mass of an aqueous dispersion of the epoxy compound (B-1), which was obtained in Synthesis Example 1, and 27 parts by mass of polyoxyethylene distyrenated phenyl ether (Emulgen A-500, manufactured by Kao Corporation) were added. The contents were then thoroughly stirred. Thereafter, 1000 parts by mass of ion exchanged water was added dropwise over 30 minutes, and the contents were mixed with stirring for another 15 minutes. The aqueous dispersion was concentrated by distillation under reduced pressure, and, accordingly, a fiber sizing agent (1), which was an aqueous dispersion having a non-volatile content of 30 mass %, was obtained.

[Preparation of Carbon Fiber Bundle]

Unsized polyacrylonitrile-based carbon fibers (an individual fiber diameter: 7 μm, a strand strength: 4400 MPa, a modulus of elasticity: 235 GPa, and the number of individual fibers: 6000) were assembled and, by using a dipping process, impregnated with an aliquot of the fiber sizing agent (1), which had been diluted with ion exchanged water to have a non-volatile content of 5 mass %. The resultant was rolled with a roller so as to adjust the coating amount of the active ingredient to be 1 mass %. The resultant was then heat-treated at 150° C. for 30 minutes. Accordingly, a carbon fiber bundle (1), which was surface-treated with the fiber sizing agent (1), was obtained.

[Evaluation of Fiber Binding Ability]

On a TM-type abrasion tester TM-200 (manufactured by Daiei Kagaku Seiki Mfg. Co., Ltd.), the carbon fiber bundle (1) was rubbed 1000 times against three stainless steel pins having a mirror-finished chromium plated surface and being arranged in a zigzag configuration, with a tension of 50 g (a reciprocating movement speed: 300 times/minute). The degree of scuffing of the carbon fiber bundle (1) was visually evaluated according to the following criteria.

A: No scuffing was observed as was before the rubbing was performed.

B: Scuffing was observed in some fibers, but the degree of scuffing was not significant in terms of practical use.

C: Scuffing was observed, and fiber breakage was observed in some regions.

D: Scuffing and individual fiber breakage were observed in numerous regions.

[Preparation of Carbon Fiber Cloth]

A cloth having a size of approximately 300 mm×300 mm was cut from a carbon fiber cloth (a sized (surface-treated) polyacrylonitrile-based carbon fiber cloth, a textile weight: 200 g/m², an individual fiber diameter: 7 μm, a strand strength: 4400 MPa, and a modulus of elasticity: 235 GPa). At room temperature, the cloth was immersed in acetone, which had a mass of approximately 30 parts by mass per part by mass of the cloth, and allowed to stand for 12 hours. After immersion, the cloth was dried in a drier at 80° C. for 2 hours to remove the resin component and the like adhering to the surface of the carbon fiber. Accordingly, an unsized (non-surface-treated) carbon fiber cloth was obtained.

The carbon fiber cloth was impregnated with an aliquot of the fiber sizing agent (1), which had been diluted with ion exchanged water to have a non-volatile content of 5 mass %, in a manner such that the coating amount of the solids became 1 mass %. The resultant was dried in a drier at 150° C. for 30 minutes, and, accordingly, a carbon fiber cloth (1) was obtained.

[Preparation of Molded Article]

A mixture was prepared by mixing 0.5 parts by mass of cobalt naphthenate (6 mass %) and 1.0 parts by mass of methyl ethyl ketone peroxide (Permek N, manufactured by NOF Corporation) with 100 parts by mass of a solution of a vinyl ester resin (Exdhoma 9102-01NP, manufactured by DIC Material Inc.). The mixture was poured onto a release-treated glass plate having a size of 350 mm×350 mm, and the carbon fiber cloth (1), obtained as described above, was placed thereon. Accordingly, a laminate was formed by using a hand lay-up molding process (8 plies). The laminate was then cured at room temperature (25° C.) for 12 hours and thereafter was further cured at 60° C. for 3 hours. Accordingly, a molded article (1), which was a carbon fiber-reinforced plastic (a carbon fiber content: 50 vol %), was obtained.

[Evaluation of Flexural Strength of Molded Article]

A measurement was performed, in accordance with JIS K 7181, on the molded article (1), which was obtained as described above. The test specimen used measured 15 mm×100 mm×2 mm (width×length×thickness).

[Evaluation of Compressive Strength of Molded Article]

A measurement was performed, in accordance with JIS K 7074, on the molded article (1), which was obtained as described above. The dumbbell test specimen used measured 13 mm×77 mm×2 mm (width×length×thickness).

[Evaluation of Interlaminar Shear Strength of Molded Article]

A measurement was performed, in accordance with JIS K 7078, on the molded article (1), which was obtained as described above. The test specimen used measured 10 mm×15 mm×2 mm (width×length×thickness).

Example 2: Production and Evaluation of Fiber Sizing Agent (2)

81 parts by mass of polyethylene glycol (moles of ethylene oxide added: 12), 30 parts by mass of polyoxyethylene monoethyl ether (Uniox M-550, manufactured by NOF Corporation, a hydroxy number: 100), and 64 parts by mass of methyl ethyl ketone were added to a four-neck flask equipped with a thermometer, a stirrer, a reflux condenser, and a dropping funnel and thoroughly stirred at 40° C. to achieve dissolution. Thereafter, 47 parts by mass of tolylene diisocyanate was added at 40° C. and allowed to react at 75° C. for 2 hours. Thereafter, 97 parts by mass of a bisphenol A epoxy resin (Epiclon 1050, manufactured by DIC Corporation, an epoxy equivalent weight: 477 g/eq) was allowed to react at a temperature of 60 to 65° C. for 6 hours. The disappearance of the 2260 cm$^{-1}$ characteristic peak of NCO was confirmed by using an infrared absorption spectrum. Subsequently, the solution was cooled to 40° C., and then 15 parts by mass of acrylic acid, 1 part by mass of t-butyl hydroquinone, and 3 parts by mass of 2-methylimidazole were loaded. The contents were then heated to a temperature of 75 to 80° C. under a flow of a gas in which nitrogen and air were mixed in a ratio of 1:1. A reaction was allowed to proceed at a temperature of 75 to 80° C. for 10 hours, and, consequently, an acid number of 1 or less (mg KOH/g) was reached. The reaction was then stopped, and, accordingly, a solution of a vinyl ester resin (A-2) was obtained. The vinyl ester resin (A-2) had a weight average molecular weight of 13800.

Thereafter, the solution was cooled to 40° C., and then 180 parts by mass of an aqueous dispersion of the epoxy compound (B-1), which was obtained in Synthesis Example 1, and 27 parts by mass of polyoxyethylene distyrenated phenyl ether (Emulgen A-500, manufactured by Kao Corporation) were added. The contents were then thoroughly stirred. Thereafter, 950 parts by mass of ion exchanged water was added dropwise over 30 minutes, and the contents were mixed with stirring for another 15 minutes. The aqueous dispersion was concentrated by distillation under reduced pressure, and, accordingly, a fiber sizing agent (2), which was an aqueous dispersion having a non-volatile content of 30 mass %, was obtained.

Example 3: Production and Evaluation of Fiber Sizing Agent (3)

85 parts by mass of polyoxyethylene monoethyl ether (Uniox M-550, manufactured by NOF Corporation, a hydroxy number: 100), 69 parts by mass of a bisphenol A epoxy resin (Epiclon 1050, manufactured by DIC Corporation, an epoxy equivalent weight: 477 g/eq), and 50 parts by mass of methyl ethyl ketone were added to a four-neck flask equipped with a thermometer, a stirrer, a reflux condenser, and a dropping funnel and thoroughly stirred at 40° C. to achieve dissolution. Thereafter, 29 parts by mass of tolylene diisocyanate was added at 40° C. and allowed to react at a temperature of 60 to 65° C. for 6 hours. The disappearance of the 2260 cm$^{-1}$ characteristic peak of NCO was confirmed by using an infrared absorption spectrum. Subsequently, the solution was cooled to 40° C., and then 10 parts by mass of acrylic acid, 1 part by mass of t-butyl hydroquinone, and 2 parts by mass of 2-methylimidazole were loaded. The contents were then heated to a temperature of 75 to 80° C. under a flow of a gas in which nitrogen and air were mixed in a ratio of 1:1. A reaction was allowed to proceed at a temperature of 75 to 80° C. for 10 hours, and, consequently, an acid number of 1 or less (mg KOH/g) was reached. The reaction was then stopped, and, accordingly, a solution of a vinyl ester resin (A-3) was obtained. The vinyl ester resin (A-3) had a weight average molecular weight of 13000.

Thereafter, the solution was cooled to 40° C. Subsequently, 24 parts by mass of a phenol novolac epoxy resin (Epiclon N-740-80M, manufactured by DIC Corporation) and 115 parts by mass of a bisphenol A vinyl ester resin (Unidic V-5500, manufactured by DIC Corporation, active ingredients: 99% or greater), both used as epoxy compounds (B-2), were added. Also, 20 parts by mass of polyoxyethylene distyrenated phenyl ether (Emulgen A-500, manufactured by Kao Corporation) was added. The contents were then thoroughly stirred. Thereafter, 860 parts by mass of ion exchanged water was added dropwise over 30 minutes, and the contents were mixed with stirring for another 15 minutes. The aqueous dispersion was concentrated by distillation under reduced pressure, and, accordingly, a fiber sizing agent (3), which was an aqueous dispersion having a non-volatile content of 30 mass %, was obtained.

Example 4: Production and Evaluation of Fiber Sizing Agent (4)

92 parts by mass of polyoxyethylene monoethyl ether (Uniox M-550, manufactured by NOF Corporation, a hydroxy number: 100), 74 parts by mass of a bisphenol A epoxy resin (Epiclon 1050, manufactured by DIC Corporation, an epoxy equivalent weight: 477 g/eq), and 50 parts by mass of methyl ethyl ketone were added to a four-neck flask equipped with a thermometer, a stirrer, a reflux condenser, and a dropping funnel and thoroughly stirred at 40° C. to achieve dissolution. Thereafter, 30 parts by mass of tolylene diisocyanate was added at 40° C. and allowed to react at a temperature of 60 to 65° C. for 6 hours. The disappearance of the 2260 cm$^{-1}$ characteristic peak of NCO was confirmed by using an infrared absorption spectrum. Subsequently, the solution was cooled to 40° C., and then 11 parts by mass of acrylic acid, 1 part by mass of t-butyl hydroquinone, and 2 parts by mass of 2-methylimidazole were loaded. The contents were then heated to a temperature of 75 to 80° C. under a flow of a gas in which nitrogen and air were mixed in a ratio of 1:1. A reaction was allowed to proceed at a temperature of 75 to 80° C. for 10 hours, and, consequently, an acid number of 1 or less (mg KOH/g) was reached. The reaction was then stopped, and, accordingly, a solution of a vinyl ester resin (A-4) was obtained. The vinyl ester resin (A-4) had a weight average molecular weight of 13000.

Thereafter, the solution was cooled to 40° C. Subsequently, 21 parts by mass of a bisphenol A epoxy resin (Epiclon 850, manufactured by DIC Corporation) and 148 parts by mass of the vinyl ester resin (X) obtained in Synthesis Example 2, both used as epoxy compounds (B-3), were added. Also, 21 parts by mass of polyoxyethylene distyrenated phenyl ether (Emulgen A-500, manufactured by Kao Corporation) was added. The contents were then thoroughly stirred. Thereafter, 920 parts by mass of ion exchanged water was added dropwise over 30 minutes, and the contents were mixed with stirring for another 15 minutes. The aqueous dispersion was concentrated by distillation under reduced pressure, and, accordingly, a fiber sizing agent (4), which was an aqueous dispersion having a non-volatile content of 30 mass %, was obtained.

Example 5: Production and Evaluation of Fiber Sizing Agent (5)

124 parts by mass of polyoxyethylene monoethyl ether (Uniox M-550, manufactured by NOF Corporation, a hydroxy number: 100), 99 parts by mass of a bisphenol A epoxy resin (Epiclon 1050, manufactured by DIC Corporation, an epoxy equivalent weight: 477 g/eq), and 65 parts by mass of methyl ethyl ketone were added to a four-neck flask equipped with a thermometer, a stirrer, a reflux condenser, and a dropping funnel and thoroughly stirred at 40° C. to achieve dissolution. Thereafter, 38 parts by mass of 1,6-hexamethylene diisocyanate was added at 40° C. and allowed to react at a temperature of 60 to 65° C. for 6 hours. The disappearance of the 2260 cm$^{-1}$ characteristic peak of NCO was confirmed by using an infrared absorption spectrum. Subsequently, the solution was cooled to 40° C., and then 15 parts by mass of acrylic acid, 1 part by mass of t-butyl hydroquinone, and 3 parts by mass of 2-methylimidazole were loaded. The contents were then heated to a temperature of 75 to 80° C. under a flow of a gas in which nitrogen and air were mixed in a ratio of 1:1. A reaction was allowed to proceed at a temperature of 75 to 80° C. for 10 hours, and, consequently, an acid number of 1 or less (mg KOH/g) was reached. The reaction was then stopped, and, accordingly, a solution of a vinyl ester resin (A-5) was obtained. The vinyl ester resin (A-5) had a weight average molecular weight of 14800.

Thereafter, the solution was cooled to 40° C., and then 460 parts by mass of an aqueous dispersion of the epoxy compound (B-1), which was obtained in Synthesis Example 1, and 27 parts by mass of polyoxyethylene distyrenated phenyl ether (Emulgen A-500, manufactured by Kao Corporation) were added. The contents were then thoroughly stirred. Thereafter, 1000 parts by mass of ion exchanged water was added dropwise over 30 minutes, and the contents were mixed with stirring for another 15 minutes. The aqueous dispersion was concentrated by distillation under reduced pressure, and, accordingly, a fiber sizing agent (5), which was an aqueous dispersion having a non-volatile content of 30 mass %, was obtained.

Example 6: Production and Evaluation of Fiber Sizing Agent (6)

124 parts by mass of polyoxyethylene monoethyl ether (Uniox M-550, manufactured by NOF Corporation, a hydroxy number: 100), 99 parts by mass of a bisphenol A epoxy resin (Epiclon 1050, manufactured by DIC Corporation, an epoxy equivalent weight: 477 g/eq), and 70 parts by mass of methyl ethyl ketone were added to a four-neck flask equipped with a thermometer, a stirrer, a reflux condenser, and a dropping funnel and thoroughly stirred at 40° C. to achieve dissolution. Thereafter, 50 parts by mass of trimethylhexamethylene diisocyanate was added at 40° C. and allowed to react at a temperature of 60 to 65° C. for 6 hours. The disappearance of the 2260 cm$^{-1}$ characteristic peak of NCO was confirmed by using an infrared absorption spectrum. Subsequently, the solution was cooled to 40° C., and then 15 parts by mass of acrylic acid, 1 part by mass of t-butyl hydroquinone, and 3 parts by mass of 2-methylimidazole were loaded. The contents were then heated to a temperature of 75 to 80° C. under a flow of a gas in which nitrogen and air were mixed in a ratio of 1:1. A reaction was allowed to proceed at a temperature of 75 to 80° C. for 10 hours, and, consequently, an acid number of 1 or less (mg KOH/g) was reached. The reaction was then stopped, and, accordingly, a solution of a vinyl ester resin (A-6) was obtained. The vinyl ester resin (A-6) had a weight average molecular weight of 14500.

Thereafter, the solution was cooled to 40° C., and then 480 parts by mass of an aqueous dispersion of the epoxy compound (B-1), which was obtained in Synthesis Example 1, and 29 parts by mass of polyoxyethylene distyrenated phenyl ether (Emulgen A-500, manufactured by Kao Corporation) were added. The contents were then thoroughly stirred. Thereafter, 1000 parts by mass of ion exchanged water was added dropwise over 30 minutes, and the contents were mixed with stirring for another 15 minutes. The aqueous dispersion was concentrated by distillation under reduced pressure, and, accordingly, a fiber sizing agent (6), which was an aqueous dispersion having a non-volatile content of 30 mass %, was obtained.

Example 7: Production and Evaluation of Fiber Sizing Agent (7)

124 parts by mass of polyoxyethylene monoethyl ether (Uniox M-550, manufactured by NOF Corporation, a hydroxy number: 100), 99 parts by mass of a bisphenol A epoxy resin (Epiclon 1050, manufactured by DIC Corporation, an epoxy equivalent weight: 477 g/eq), and 70 parts by mass of methyl ethyl ketone were added to a four-neck flask equipped with a thermometer, a stirrer, a reflux condenser, and a dropping funnel and thoroughly stirred at 40° C. to achieve dissolution. Thereafter, 50 parts by mass of isophorone diisocyanate was added at 40° C. and allowed to react at a temperature of 60 to 65° C. for 6 hours. The disappearance of the 2260 cm$^{-1}$ characteristic peak of NCO was confirmed by using an infrared absorption spectrum. Subsequently, the solution was cooled to 40° C., and then 15 parts by mass of acrylic acid, 1 part by mass of t-butyl hydroquinone, and 3 parts by mass of 2-methylimidazole were loaded. The contents were then heated to a temperature of 75 to 80° C. under a flow of a gas in which nitrogen and air were mixed in a ratio of 1:1. A reaction was allowed to proceed at a temperature of 75 to 80° C. for 10 hours, and, consequently, an acid number of 1 or less (mg KOH/g) was reached. The reaction was then stopped, and, accordingly, a solution of a vinyl ester resin (A-7) was obtained. The vinyl ester resin (A-7) had a weight average molecular weight of 14000.

Thereafter, the solution was cooled to 40° C., and then 480 parts by mass of an aqueous dispersion of the epoxy compound (B-1), which was obtained in Synthesis Example 1, and 29 parts by mass of polyoxyethylene distyrenated phenyl ether (Emulgen A-500, manufactured by Kao Corporation) were added. The contents were then thoroughly stirred. Thereafter, 1000 parts by mass of ion exchanged water was added dropwise over 30 minutes, and the contents were mixed with stirring for another 15 minutes. The aqueous dispersion was concentrated by distillation under reduced pressure, and, accordingly, a fiber sizing agent (7), which was an aqueous dispersion having a non-volatile content of 30 mass %, was obtained.

Carbon fiber bundles (2) to (7) and molded articles (2) to (7) were prepared in manners similar to those of Example 1, with the only difference being that the fiber sizing agent (1), which was used in Example 1, was replaced with the fiber sizing agents (2) to (7), respectively. Subsequently, the evaluations were performed.

Comparative Example 1: Production of Fiber Sizing Agent (R1)

149 parts by mass of glycerol dimethacrylate hexamethylene diisocyanate (UA101H, manufactured by Kyoeisha Chemical Co., Ltd., the number of terminal unsaturated groups: 4), 16.5 parts by mass of a nonionic emulsifier (polyoxyethylene (70 mol) styrenated (5 mol) cumylphenol (mass ratio: 90:10)), and 142 parts by mass of methyl ethyl ketone were added to a four-neck flask equipped with a thermometer, a stirrer, a reflux condenser, and a dropping funnel, and dissolution was performed uniformly at 50° C. Subsequently, the contents were transferred to an emulsion vessel, and then 166 parts by weight of polyglycerol polyglycidyl ether (Denacol EX-521, manufactured by Nagase ChemteX Corporation, an epoxy equivalent weight: 183 g/eq, and the number of epoxy groups: 3 or greater) was added and uniformly dispersed with stirring. Subsequently, 3000 parts by mass of ion exchanged water was added over 10 minutes while the contents were forcibly stirred with a homomixer, and, accordingly, the contents were forcibly emulsified. Subsequently, the aqueous dispersion was concentrated by distillation under reduced pressure, and, accordingly, a fiber sizing agent (R1), which was an aqueous dispersion having a non-volatile content of 15 mass %, was obtained.

A carbon fiber bundle (R1) and a molded article (R1) were prepared in manners similar to those of Example 1, with the only difference being that the fiber sizing agent (1), which was used in Example 1, was replaced with the fiber sizing agent (R1). Subsequently, the evaluations were performed.

The results of the evaluations of Examples 1 to 7 and Comparative Example 1 are shown in Tables 1 and 2.

TABLE 1

|  |  | Example 1 | Example 2 | Example 3 | Example 4 |
|---|---|---|---|---|---|
| Fiber sizing agent | | (1) | (2) | (3) | (4) |
| Vinyl ester resin (A) | | A-1 | A-2 | A-3 | A-4 |
| Epoxy compound (B) | | B-1 | B-1 | B-2 | B-3 |
| Mass ratio (A:B) | | 67:33 | 83:17 | 90:10 | 90:10 |
| Evaluations | Fiber binding ability | A | A | A | A |
| | Flexural strength of molded article (MPa) | 890 | 860 | 940 | 980 |
| | Compressive strength of molded article (MPa) | 320 | 300 | 355 | 360 |
| | Interlaminar shear strength of molded article (MPa) | 74 | 72 | 79 | 78 |

TABLE 2

|  |  | Example 5 | Example 6 | Example 7 | Comparative Example 1 |
|---|---|---|---|---|---|
| Fiber sizing agent | | (5) | (6) | (7) | (R1) |
| Vinyl ester resin (A) | | A-5 | A-6 | A-7 | |
| Epoxy compound (B) | | B-1 | B-1 | B-1 | |
| Mass ratio (A:B) | | 67:33 | 67:33 | 67:33 | |
| Evaluations | Fiber binding ability | A | A | A | C |
| | Flexural strength of molded article (MPa) | 870 | 850 | 880 | 700 |
| | Compressive strength of molded article (MPa) | 315 | 305 | 310 | 205 |
| | Interlaminar shear strength of molded article (MPa) | 73 | 72 | 70 | 57 |

It was confirmed that the fiber sizing agent of Examples 1 to 7, which are fiber sizing agents of the present invention, had excellent fiber binding ability, and the molded articles produced therewith had excellent strength.

In contrast, Comparative Example 1 is an example in which the fiber sizing agent used included an aliphatic epoxy compound and a compound that contains a terminal unsaturated group and a polar group in a molecule, and it was confirmed that the fiber binding ability of the fiber sizing agent was insufficient, and the strengths of the molded article produced therewith were also insufficient.

The invention claimed is:

1. A fiber sizing agent comprising:
   a vinyl ester resin (A) having an alkoxy polyoxyalkylene structure and a urethane linkage;
   an epoxy compound (B); and
   an aqueous medium.

2. The fiber sizing agent according to claim 1, wherein the vinyl ester resin (A) has a structure derived from a bisphenol A epoxy resin.

3. The fiber sizing agent according to claim 1, wherein the epoxy compound (B) is an aromatic epoxy resin.

4. A fiber material comprising the fiber sizing agent according to claim 1.

5. A molding material comprising the fiber material according to claim 4 and a thermosetting resin.

6. A molded article comprising a cured product of the molding material according to claim 5.

7. The fiber sizing agent according to claim 2, wherein the epoxy compound (B) is an aromatic epoxy resin.

8. A fiber material comprising the fiber sizing agent according to claim 2.

9. A fiber material comprising the fiber sizing agent according to claim 3.

10. A fiber material comprising the fiber sizing agent according to claim 7.

11. A molding material comprising the fiber material according to claim 8 and a thermosetting resin.

12. A molding material comprising the fiber material according to claim 9 and a thermosetting resin.

13. A molding material comprising the fiber material according to claim 10 and a thermosetting resin.

14. A molded article comprising a cured product of the molding material according to claim 11.

15. A molded article comprising a cured product of the molding material according to claim 12.

16. A molded article comprising a cured product of the molding material according to claim 13.

* * * * *